United States Patent
Birman et al.

(10) Patent No.: US 9,568,343 B2
(45) Date of Patent: Feb. 14, 2017

(54) DASH LINE POINTER

(71) Applicant: Continental Automotive Systems, Inc., Auburn Hills, MI (US)

(72) Inventors: Vyacheslav Birman, Auburn Hills, MI (US); Shirley Yu, Troy, MI (US)

(73) Assignee: Continental Automotive Systems, Inc., Auburn Hills ( * ) Notice: Subject to any disclaimer, the term of this patent is extended or adjusted under 35 U.S.C. 154(b) by 174 days.

(21) Appl. No.: 14/523,361

(22) Filed: Oct. 24, 2014

(65) Prior Publication Data

US 2016/0116311 A1 Apr. 28, 2016

(51) Int. Cl.
 *G01D 11/28* (2006.01)
 *G01D 13/26* (2006.01)
 *B60K 37/02* (2006.01)

(52) U.S. Cl.
 CPC ............ *G01D 13/265* (2013.01); *B60K 37/02* (2013.01); *G01D 11/28* (2013.01); *B60K 2350/2034* (2013.01); *B60K 2350/2065* (2013.01); *B60K 2350/408* (2013.01)

(58) Field of Classification Search
 CPC ...... G01D 13/265; G01D 11/28; G01D 13/26; B60K 37/02; B60K 2350/2065; B60K 2350/2034; B60K 2350/408
 USPC ......... 116/286–288, 298, 305, 334, DIG. 36; 362/26–30, 85, 23.01, 23.14, 23.21
 See application file for complete search history.

(56) References Cited

U.S. PATENT DOCUMENTS

| | | | | |
|---|---|---|---|---|
| 2,128,246 A * | 8/1938 | Hardesty | ............... | G02B 6/006 116/286 |
| 2,278,520 A * | 4/1942 | Pfeffer | ................... | G04B 19/30 101/483 |
| 2,603,129 A * | 7/1952 | Dreyer | ................... | G02B 27/28 116/286 |
| 2,831,453 A * | 4/1958 | Hardesty | ............... | G01D 11/28 116/288 |
| 4,991,064 A * | 2/1991 | Clem | ..................... | B60Q 3/004 116/286 |
| 5,040,480 A * | 8/1991 | Iwazaki | ................ | G01D 11/28 116/286 |
| 6,025,820 A * | 2/2000 | Salmon | ................. | B60K 37/02 116/286 |
| 6,511,194 B1 * | 1/2003 | Noll | ...................... | G01D 11/28 116/286 |

(Continued)

FOREIGN PATENT DOCUMENTS

EP 2587121 A1 5/2013

*Primary Examiner* — R. A. Smith
*Assistant Examiner* — Tania Courson

(57) ABSTRACT

A gauge assembly having a pointer arm extending away from a hub is supported for movement about an axis to indicate a current vehicle condition. This is accomplished when the pointer points to a specific location and telltales on the gauge surface. The pointer arm has a pointer arm viewing surface with one or more clear portions and one or more illuminated portions along the length of the pointer arm viewing surface. The pointer arm further includes one or more raised steps formed on a bottom surface of the pointer arm located opposite the viewing surface of the pointer arm. The one or more raised steps is aligned with the one or more illuminated portions and the one or more raised steps have a reflective surface for reflecting light through the one more illuminated portions on the viewing surface.

19 Claims, 4 Drawing Sheets

(56) References Cited

U.S. PATENT DOCUMENTS

| | | | | |
|---|---|---|---|---|
| 6,718,906 B2* | 4/2004 | Quigley | ............... | G01P 1/08 |
| | | | | 116/62.1 |
| 6,981,464 B2* | 1/2006 | Birman | ............ | G01D 13/26 |
| | | | | 116/288 |
| 7,404,374 B2* | 7/2008 | Kato | .............. | G01D 11/28 |
| | | | | 116/286 |
| 7,426,864 B2* | 9/2008 | Cook | ................ | B60K 37/02 |
| | | | | 116/284 |
| 7,556,390 B2* | 7/2009 | Takato | ............ | G01D 13/265 |
| | | | | 116/288 |
| 7,592,972 B2* | 9/2009 | Eckardt | ............ | B60K 37/02 |
| | | | | 345/32 |
| 7,814,859 B2* | 10/2010 | Fournier | ............ | G01D 13/22 |
| | | | | 116/328 |
| 7,930,990 B2* | 4/2011 | Fournier | ........... | G01D 13/265 |
| | | | | 116/328 |
| 8,261,686 B2 | 9/2012 | Birman et al. | | |
| 8,537,561 B1* | 9/2013 | Strout | ............ | B60S 1/0491 |
| | | | | 116/54 |
| 2007/0035960 A1* | 2/2007 | Birman | ........... | G01D 13/265 |
| | | | | 362/489 |
| 2014/0165904 A1 | 6/2014 | Birman et al. | | |
| 2015/0136015 A1* | 5/2015 | Takeda | ............ | G01D 13/02 |
| | | | | 116/298 |
| 2015/0151676 A1* | 6/2015 | Birman | ............ | G01D 13/265 |
| | | | | 362/23.14 |
| 2016/0093405 A1* | 3/2016 | Birman | ............ | G12B 11/04 |
| | | | | 116/288 |

* cited by examiner

US 9,568,343 B2

DASH LINE POINTER

FIELD OF THE INVENTION

The present invention relates to vehicle instrument panels and clusters, and more specifically to a pointer for a gauge that includes illuminated portions and clear portions with telltales viewable in the clear portions.

BACKGROUND OF THE INVENTION

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. A pointer is typically provided that rotates about a fixed axis that points to value on the gauge face to communicate current values of an operational parameter. During rotation pointers can obstruct telltales located on the gauge surface below the pointer. It is therefore desirable to develop pointers that do not obstruct the driver's ability to view the telltales beneath the pointer. Additionally pointers are often illuminated to further enhance visibility and appearance; however, their appearance can be improved upon by adding designs and telltales on the viewing surface.

SUMMARY OF THE INVENTION

The subject invention relates to a gauge assembly having a gauge surface area or areas having a plurality of telltales representing a vehicle operating parameter. A pointer having a pointer arm extending away from a hub is supported for movement about an axis to indicate a current condition of the vehicle operating parameter. This is accomplished when the pointer points to a specific location on the gauge surface. The gauge assembly further includes an illumination source for illuminating the pointer arm. The pointer arm has a pointer arm viewing surface with one or more clear portions and one or more illuminated portions along the length of the pointer arm viewing surface. The pointer arm further includes one or more raised steps formed on a bottom surface of the pointer arm located opposite the viewing surface of the pointer arm. The one or more raised steps is aligned with the one or more illuminated portions and the one or more raised steps have a reflective surface for reflecting light through the one more illuminated portions on the viewing surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
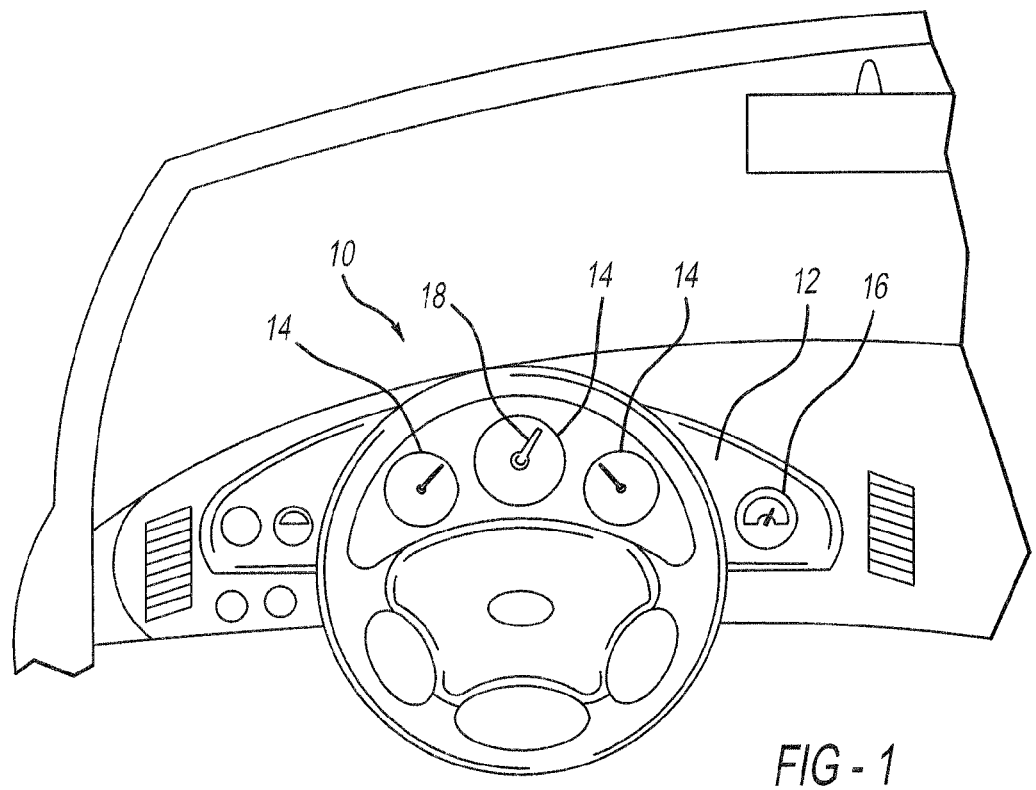
FIG. 1 is a schematic view of an example instrument panel for a motor vehicle.
Figure 2:
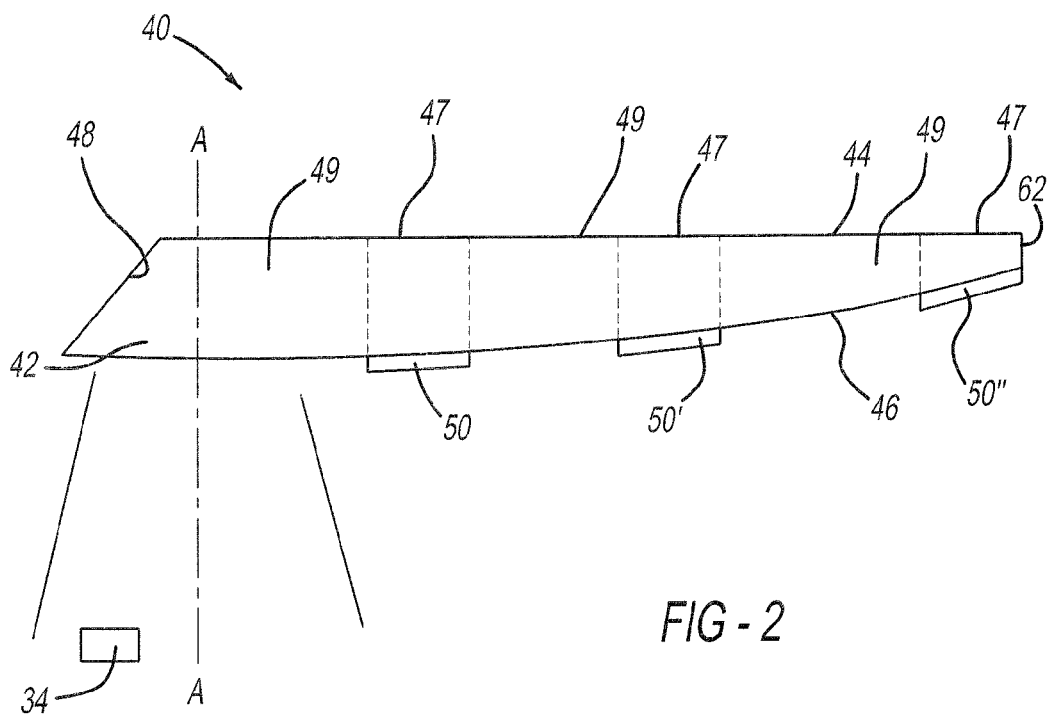
FIG. 2 is a side view of a pointer arm made in accordance with the present invention.

Referring now to the drawings generally, with specific reference to FIG. 1, there is provided a dashboard generally shown at 10 for a motor vehicle. The dashboard 10 includes an instrument panel 12 that includes a plurality of gauges 14 and dials 16. The gauges 14 communicate information indicative of vehicle operating parameters to vehicle operator. A pointer assembly generally indicated at 18 is included for the gauge 14 that rotates about an axis A-A to point to a specific portion of the telltales provided in each of the gauges 14 to indicate a current value of an operating condition.

Figure 3:
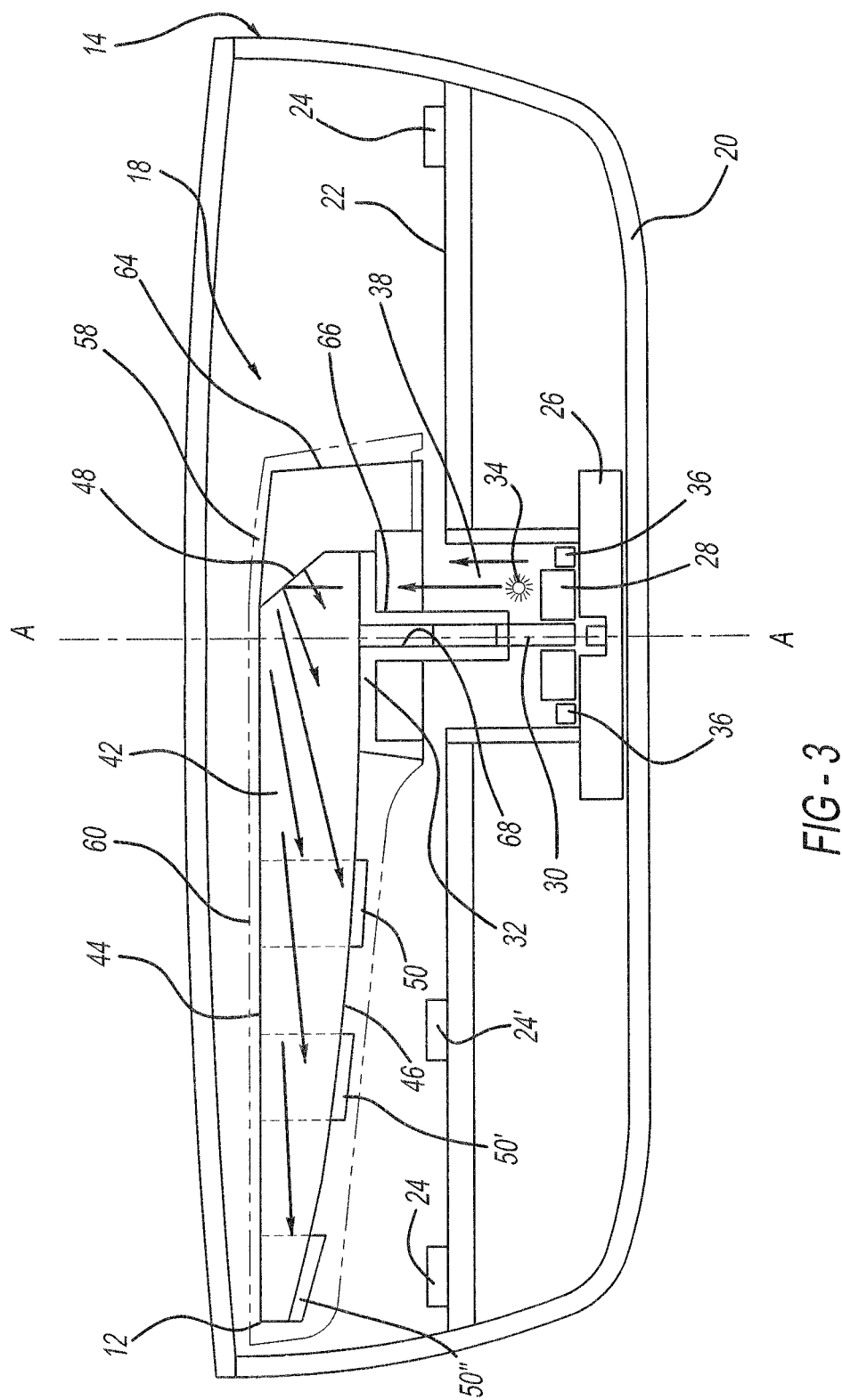
FIG. 3 is a cross-section of an example pointer assembly showing the arm of FIG. 2 in the operating environment of a gauge assembly.

Referring now to FIG. 3, gauge assembly 14 includes a housing 20 that supports a gauge surface 22 with graphics or telltales 24, 24'. A printed circuit board 26 supports a stepper motor 28 that drives a shaft 30. The shaft 30 maybe a clear shaft or a shaft including a central opening through which light may propagate upwardly into the pointer assembly 18.

A shroud 32 is supported on the shaft 30. A light source 34 is supported on the printed circuit board 26 along an axis A-A. The light source 34 propagates light upward into the pointer assembly 18 along the axis A-A. Other light sources 36 are optionally be provided on the printed circuit board 26 if desired for a particular application as will be appreciated by those skilled in the art. The light source 34 along the axis A may be utilized to direct light along the axis A-A. The light sources 36 may also be utilized that are disposed around the axis A-A within the light housing 38 to direct light upward into the pointer assembly 18, if required depending on the final design of the gauge 14.

The pointer assembly 18 includes a pointer 40 disposed about the axis A-A and arm portion 44. In a preferred embodiment, the shaft 30 is clear such that shaft 30 will also propagate light from the light source 34 upward into the pointer 40. In a preferred embodiment, the light source 34 is a light emitting diode, however, other light sources as are known by those skilled in the art are also used in the present invention.

The pointer 40 includes a pointer arm viewing surface 44, a bottom surface 46 and an angled reflecting surface 48. The reflecting surface 48 reflects light received from illuminating source 34 into the length of said pointer arm 18.

Viewable on the pointer arm viewing surface 44, along length of the pointer 40, there are alternating illuminated portions 47 which are illuminated by the light source 34 and clear portions 49, the clear portions allow any telltales 24, 24' on the gauge surface 22 to be visible and viewable through the clear portion as the pointer passes over the telltale 24, 24' during operation of the pointer assembly 18. Also the clear portions 49 allows other telltales such as illuminated vehicle function warning lights to be visible thought the clear portion, without being obstructed by the pointer. In an optional embodiment of the invention each illuminated portion 47 has a pointer graphic 51 shown in the drawings as an arrow mark within the illuminated portions 47. Additionally the illuminated portions 47 can be shaped like an arrow, chevron or some other design to improve the aesthetics of the pointer assembly 18. While arrows are shown it is within the scope of this invention for virtually any type of design or indicia to be used.

The illuminated portions 47 are aligned one or more raised steps 50, 50', 50" which are raised surfaces formed on the bottom surface 46 of the pointer 40. The raised steps 50, 50', 50" are coated with a reflective material to reflect light through the respective illuminated portion 47. While three raised steps 50, 50', 50' are shown in the drawings, it is within the scope of the invention for a greater or lesser number of stepped portions to be used; however, the number of raised steps used depends on the number of illuminated portions created on the pointer 40.

Figure 4:
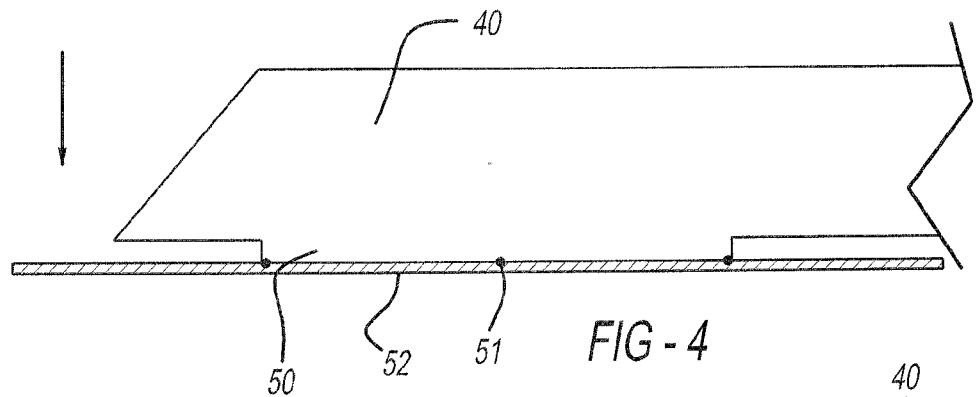
FIG. 4 is an enlarged schematic view showing application of the reflective material onto the pointer.
Figure 5:
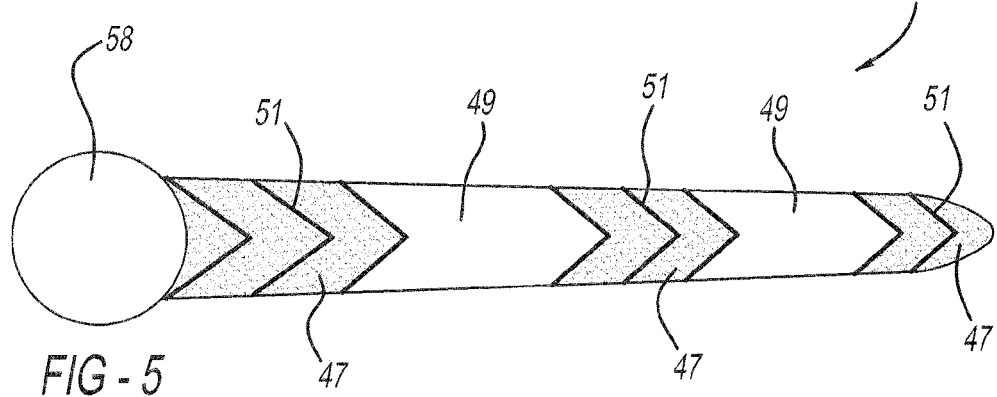
FIG. 5 is overhead top plan view of the pointer arm viewing surface of the pointer.

Referring to FIGS. 4 and 5 the pointer 40 is made of molded polymer material such as polycarbonate, however, it is within the scope of the invention for the pointer to be made of different material depending on the need of a particular application. Referring to FIG. 4, during manufacturing the pointer 40 is pressed onto a layer of reflective material such as foil 52. The raised steps 50, 50', 50" are spaced apart from the bottom surface 46 so the foil 42 does not contact the bottom surface 46, and only makes contact with and attaches to the stepped portion 50, 50', 50". The foil 52 adheres to the stepped portion 50, 50', 50" thereby providing a reflective surface that created the illuminated portion 47. In another aspect of the invention the foil 52 or the stepped portion 50, 50', 50" has a graphic formed thereon that creates the pointer graphic 51 visible on the pointer arm viewing surface 44 of the pointer 40, as discussed above with respect to an alternate embodiment of the invention.

FIG. 5 shows an overhead view of the pointer arm viewing surface 44 of the pointer 40. Light illuminates the illuminated portions 47 as it is reflected by the foil 52 that has been connected to the stepped portions 50, 50', 50". The illuminated portions 47 can have shaped boarders, which are shown to have an arrow or chevron shape, however, it is possible for the illuminated portions to have other shapes such as, but not limited to squares, rectangles, triangles, circles, dashes, etc. FIG. 5 also shows the optional pointer graphic 51 which are one or more graphics or indicia formed on the surface of the foil 52 or within the stepped portions 50, 50', 50". The clear portions 49 are not illuminated by reflective light and any telltales located below the clear portions 49 (i.e., on the gauge surface) can be seen through the pointer 40.

It should be readily appreciated that the pointer be used independently in a gauge in many mounted configurations without deviating from the scope or the present invention. However, in a typical embodiment, an optional cap 58 is disposed over the base 42 of the pointer 40 eliminate a possible viewable bright spot of the pointer 40. The cap 58 includes an arm portion 60 that extends toward the tip 62. A counterweight 64 is supported by the shroud 32 under the cap 58. The shroud 32 includes a shroud stem 66 that includes a central opening 68 along the axis A-A which receives the shaft 30.

Figure 6:
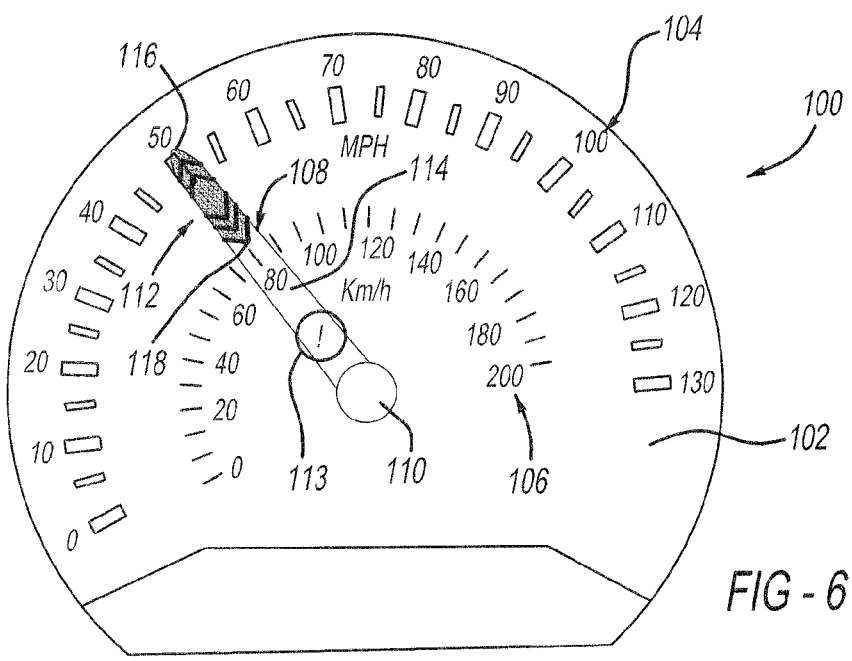
FIG. 6 is an alternate embodiment of the invention showing a speedometer gauge.
Figure 7:
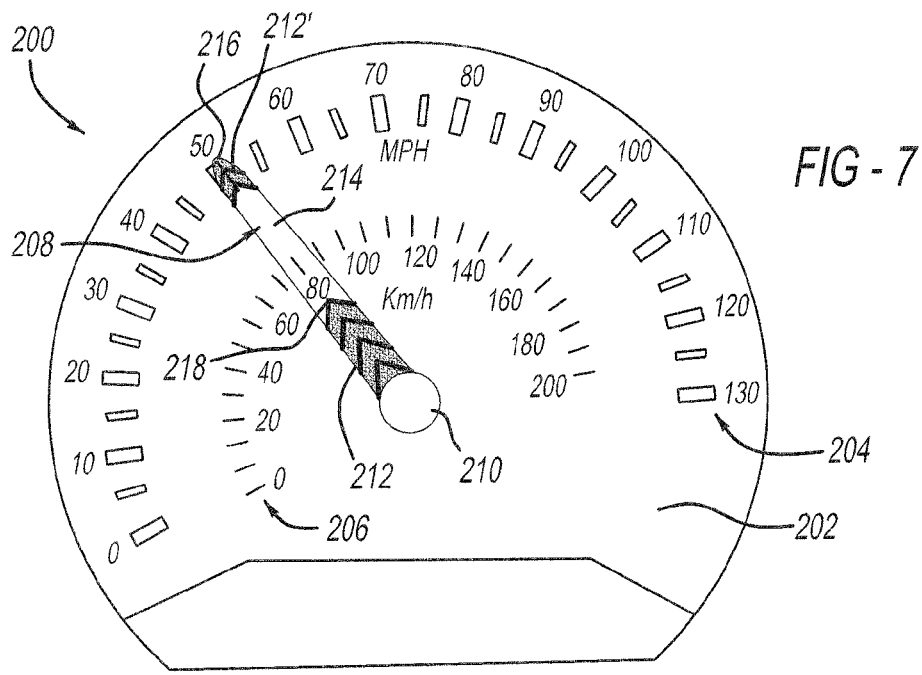
FIG. 7 is an alternate embodiment of the invention showing a speedometer gauge.
Figure 8:
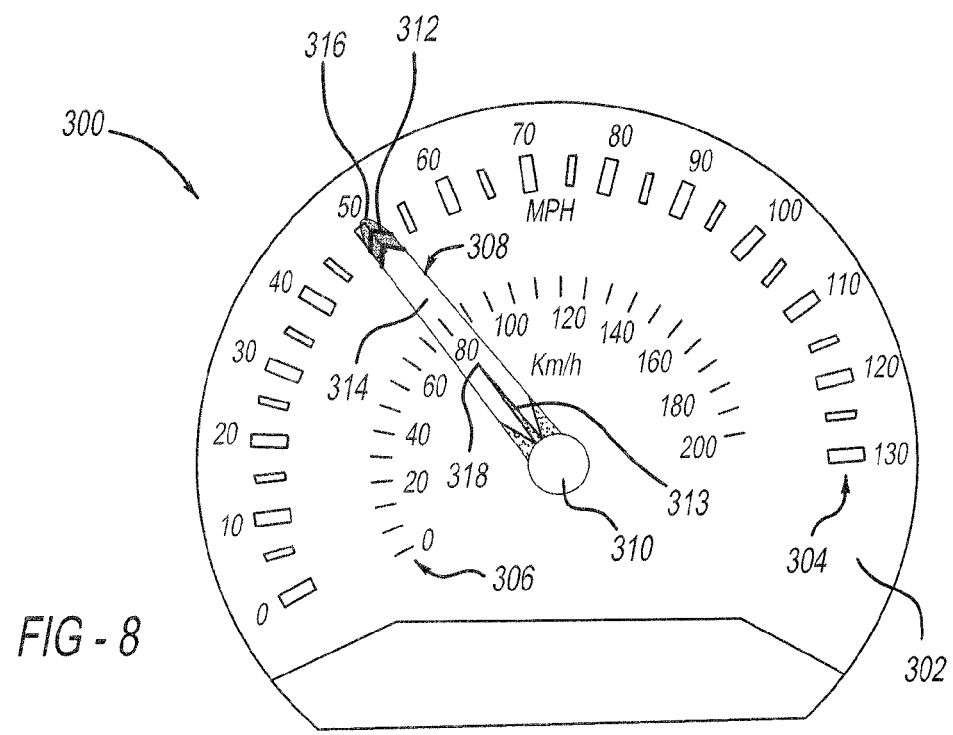
FIG. 8 is an alternate embodiment of the invention showing a speedometer gauge.

FIGS. 6-8 show alternate embodiments used in connection with a speedometer gauge. FIG. 6 shows a speedometer gauge 100 with a gauge surface 102 having a set of mile per hour graphics 104 (MPH) and a set of kilometer per hour graphics 106 (KPH). A pointer 108 is connected to a hub 110 and rotates among the different graphics 104, 106 to indicate vehicle speed. In the present embodiment of the invention the pointer 108 has an illuminated portion 112, at the tip of the pointer and has a diamond or double sided arrow shape. There is a clear portion 114 that extends between the illuminated portion 112 and the hub 110. When the pointer 108 rotates the a point 116 of the illuminated portion 112 will point to a specific one of the mile per hour graphics 104, while a point 118 of the illuminated portion 112 will point to a specific one of the kilometer per hour graphics 106, that corresponds to the mile per hour graphics 104 and vice-versa. The kilometer per hour graphics 106 will be visible though the clear portion 114 as will any other illuminated telltales 113. It is within the scope of this invention for the mile per hour graphics 104 and kilometer per hour graphics to be switched so that the kilometer per hour graphics 106 are on the outer perimeter or the gauge surface 102 and the mile per hour graphics 104 would be located beneath the clear portion 114 when the pointer 108 rotates. It is also within the scope of this invention for the speedometer gauge 100 to be some other types of gauge with different graphics.

Referring now to FIG. 7 there is a speedometer gauge 200 with a gauge surface 202 having a set of mile per hour graphics 204 (MPH) and a set of kilometer per hour graphics 206 (KPH). A pointer 208 is connected to a hub 210 and rotates among the different graphics 204, 206 to indicate vehicle speed. In the present embodiment of the invention the pointer 208 has two illuminated portions 212, 212', one at the tip of the pointer and one toward the hub 210. Between the two illuminated portions 212, 212' is a clear portion 214. The illuminated portions 212, 212' each have an arrow shape; however, it is within the scope of the invention for them to have any suitable shape. When the pointer 208 rotates the a point 216 of the illuminated portion 212' will point to a specific one of the mile per hour graphics 204, while a point 218 of the illuminated portion 212 will point to a specific one of the kilometer per hour graphics 206, that corresponds to the mile per hour graphics 204 and vice-versa. The kilometer per hour graphics 206 will be visible though the clear portion 214. It is within the scope of this invention for the mile per hour graphics 204 and kilometer per hour graphics to be switched so that the kilometer per hour graphics 206 are on the outer perimeter or the gauge surface 202 and the mile per hour graphics 204 would be located beneath the clear portion 214 when the pointer 208 rotates. It is also within the scope of this invention for the speedometer gauge 200 to be some other types of gauge with different graphics. The description of the invention is merely exemplary in nature and, thus, variations that do not depart from the essence of the invention are intended to be within the scope of the invention. Such variations are not to be regarded as a departure from the spirit and scope of the invention.

Referring now to FIG. 8 there is a speedometer gauge 300 with a gauge surface 302 having a set of mile per hour graphics 304 (MPH) and a set of kilometer per hour graphics 306 (KPH). A pointer 308 is connected to a hub 310 and rotates among the different graphics 304, 306 to indicate vehicle speed. In the present embodiment of the invention the pointer 308 has an illuminated portion 312 at the tip of the pointer 308. There is another illuminated portion 313 that is in the shape of an illuminated needle extending from the hub 310. Between the illuminated portion 312 and illuminated portion 313 is a clear portion 314. When the pointer 308 rotates the a point 316 of the illuminated portion 312 will point to a specific one of the mile per hour graphics 304, while a point 318 of the illuminated portion 313 will point to a specific one of the kilometer per hour graphics 306, that corresponds to the mile per hour graphics 304 and vice-versa. The kilometer per hour graphics 306 will be visible though the clear portion 314. It is within the scope of this invention for the mile per hour graphics 304 and kilometer per hour graphics to be switched so that the kilometer per hour graphics 306 are on the outer perimeter or the gauge surface 302 and the mile per hour graphics 304 would be located beneath the clear portion 314 when the pointer 308 rotates. It is also within the scope of this invention for the speedometer gauge 300 to be some other types of gauge with different graphics.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A gauge assembly comprising:
    a gauge surface including a plurality of telltales on the gauge surface representing a vehicle operating parameter;
    a pointer supported for movement about an axis to indicate a current condition of the vehicle operating parameter by pointing to a specific location on the gauge surface, said pointer including a pointer arm extending away from a hub;
    an illumination source for illuminating said pointer arm;
    said pointer arm having a viewing surface with one or more clear portions and one or more illuminated portions along the length of the pointer arm viewing surface; and
    one or more raised steps formed on a bottom surface of said pointer arm, said bottom surface facing said gauge surface, and wherein the one or more raised steps is aligned with the respective one or more illuminated portions, wherein the one or more raised steps includes a reflective surface for reflecting light through the one or more illuminated portions on the pointer arm viewing surface and said one or more clear portions allows at least one of the plurality of telltales on the gauge surface to be viewed through said one or more clear portions on pointer arm viewing surface when said pointer arm is positioned above said at least one of said plurality of telltales on said gauge surface.

2. The gauge assembly of claim 1 further comprising a pointer graphic formed on the one or more raised steps, said pointer graphic being viewable on the pointer arm viewing surface.

3. The gauge assembly of claim 2 further comprising a layer of reflective material connected to the one or more raised steps to form said reflective surface.

4. The gauge assembly of claim 3 further comprising a pointer graphic formed on said layer of reflective material.

5. The gauge assembly of claim 3 further comprising a void defined between said layer of reflective material and said bottom surface.

6. The gauge assembly of claim 1 wherein said gauge assembly is a speedometer and the plurality of telltales include mile per hour telltales and kilometer per hour telltales.

7. The gauge assembly of claim 6 wherein the one or more illuminated portions is a single illuminated portion located at the tip of the pointer, said single illuminated portion has a double arrow shape with a first point that points toward the mile per hour telltales and a second point that points toward the kilometer per hour telltales, wherein the kilometer per hour telltales are visible through the one or more clear portions when the pointer rotates over the kilometer per hour telltales.

8. A gauge assembly comprising:
    a gauge surface area including a plurality of telltales on the gauge surface representing a vehicle operating parameter;
    a pointer supported for movement about an axis to indicate a current condition of the vehicle operating parameter by pointing to a specific location on the gauge surface, said pointer including a pointer arm extending away from a hub;
    an illumination source for illuminating said pointer arm;
    said pointer arm has a viewing surface with one or more clear portions and a plurality of illuminated portions, wherein said one or more clear portions is positioned in between at least two of said plurality of illuminated portions and are viewable along the length of the pointer arm viewing surface; and
    a plurality of raised steps formed on a bottom surface of said pointer arm, said bottom surface facing said gauge surface, and wherein each one of the plurality of raised steps is aligned with a respective one of the plurality of illuminated portions, wherein the plurality of raised steps includes a reflective surface for reflecting light through the respective one of the plurality of illuminated portions on the pointer arm viewing surface and the one or more clear portions allow at least one of the plurality of telltales on the gauge surface to be viewed through said one or more clear portions on pointer arm viewing surface when said pointer arm is positioned above said at least one of said plurality of telltales on said gauge surface.

9. The gauge assembly of claim 8 further comprising a pointer graphic formed on the plurality of raised steps, said pointer graphic being viewable on the pointer arm viewing surface.

10. The gauge assembly of claim 9 further comprising further comprising a layer of reflective material connected to each one of the plurality of raised steps to form said reflective surface.

11. The gauge assembly of claim 10 further comprising a pointer graphic formed on said layer of reflective material.

12. The gauge assembly of claim 10 further comprising a void defined between said layer of reflective material and said bottom surface.

13. The gauge assembly of claim 8 wherein said gauge assembly is a speedometer and the plurality of telltales include mile per hour telltales and kilometer per hour telltales.

14. The gauge assembly of claim 13 wherein one illuminated portion of the plurality of illuminated portions is located at the tip of the pointer and has a point that points toward the mile per hour telltales and a second one of the plurality of illuminated portions has a point that points toward the kilometer per hour telltales, wherein the kilometer per hour telltales are visible through the one or more clear portions when the pointer rotates over the kilometer per hour telltales.

15. A gauge assembly comprising:
    a gauge surface area including a plurality of telltales including mile per hour telltales and kilometer per hour telltales on the gauge surface representing a vehicle operating parameter;

a pointer supported for movement about an axis to indicate a current condition of the vehicle operating parameter by pointing to a specific location on the gauge surface, said pointer including a pointer arm extending away from a hub;

an illumination source for illuminating said pointer arm;

said pointer arm has a viewing surface with one or more clear portions and a plurality of illuminated portions, wherein said one or more clear portions is positioned in between at least two of said plurality of illuminated portions and are viewable along the length of the pointer arm viewing surface;

a plurality of raised steps formed on a bottom surface of said pointer arm, wherein each one of the plurality of raised steps is aligned with a respective one of the plurality of illuminated portions, wherein the plurality of raised steps includes a reflective surface for reflecting light through the respective one of the plurality of illuminated portions on the pointer arm viewing surface, wherein the plurality of illuminated portions include one illuminated portion located at the tip of the pointer and having a point that points toward the mile per hour telltales and a second one of the plurality of illuminated portions has an point that points toward the kilometer per hour telltales, wherein the kilometer per hour telltales are visible through the one or more clear portions when the pointer rotates over the kilometer per hour telltales.

16. The gauge assembly of claim 15 further comprising a pointer graphic formed on the plurality of raised steps, said pointer graphic being viewable on the pointer arm viewing surface.

17. The gauge assembly of claim 15 further comprising further comprising a layer reflective material connected to each one of the plurality of raised steps.

18. The gauge assembly of claim 15 further comprising a layer reflective material that includes a pointer graphic formed on the layer of reflective material.

19. The gauge assembly of claim 15 wherein the plurality of telltales include other illuminated telltales on the gauge surface area.

* * * * *